United States Patent [19]

Burr

[11] Patent Number: 4,566,280

[45] Date of Patent: Jan. 28, 1986

[54] GAS TURBINE ENGINE COMBUSTOR SPLASH RING CONSTRUCTION

[76] Inventor: Donald N. Burr, 103 Woodfield Crossing, Glastonbury, Conn. 06033

[21] Appl. No.: 610,346

[22] Filed: May 15, 1984

Related U.S. Application Data

[63] Continuation-in-part of Ser. No. 477,903, Mar. 23, 1983, abandoned.

[51] Int. Cl.⁴ .......... F02C 7/00

[52] U.S. Cl. .......... 60/757; 60/754

[58] Field of Search .......... 60/752, 754, 755, 756, 60/757, 759, 39.32

[56] References Cited

U.S. PATENT DOCUMENTS

| | | | |
|---|---|---|---|
| 2,785,878 | 3/1957 | Conrad | 60/754 |
| 3,369,363 | 2/1968 | Campbell | 60/757 |
| 3,845,620 | 11/1974 | Kenworthy | 60/757 |
| 3,995,442 | 12/1976 | Stamm | 60/757 |
| 4,184,326 | 1/1980 | Pane, Jr. et al. | 60/757 |
| 4,206,865 | 6/1980 | Miller | 60/757 |
| 4,242,871 | 1/1981 | Breton | 60/757 |
| 4,380,906 | 4/1983 | Dierberger | 60/757 |
| 4,458,481 | 7/1984 | Ernst | 60/757 |

FOREIGN PATENT DOCUMENTS

| | | | |
|---|---|---|---|
| 994115 | 8/1976 | Canada | 60/756 |
| 49190 | 4/1982 | European Pat. Off. | 60/757 |
| 1270889 | 6/1968 | Fed. Rep. of Germany | 60/757 |
| 2034874 | 6/1980 | United Kingdom | 60/757 |

*Primary Examiner*—Louis J. Casaregola
*Assistant Examiner*—Timothy S. Thorpe
*Attorney, Agent, or Firm*—Robert S. Smith

[57] ABSTRACT

A combustor subassembly for a gas turbine engine, which includes a plurality of modular elements. Each modular element is generally annular and extends from a first axial portion to a second axial portion. The second axial portion is flared inwardly toward the geometric center line of the modular element. The modular elements are disposed in nested, substantially coaxial relationship with successive modular elements spaced axially along a substantially common center line. A plurality of the adjacent modular elements have respective first and second axial portions disposed in overlapping relationship. The overlapping of the modular elements define annular flow passages for directing cooling air into the combustor. Each of a plurality of modular elements include holes therein in the first axial portion at an axial portion thereof which overlaps the second axial portion of another modular element. In addition each of a plurality of the modular elements include holes therein in the second axial portion.

20 Claims, 2 Drawing Figures

GAS TURBINE ENGINE COMBUSTOR SPLASH RING CONSTRUCTION

RELATED APPLICATIONS

This application is a continuation-in-part application of application Ser. No. 477,903, filed on Mar. 23, 1983 now abandoned.

BACKGROUND OF THE INVENTION

The invention relates to gas turbine engine constructions and particularly to the design of combustor splash rings. Such splash rings function to limit the maximum temperature of the walls of the combustor. The combustors, which may be either can shaped and disposed along the sides of the engine or annular or encircle the entire engine are disposed with the exterior thereof at a higher pressure than the pressure of the compressed air reaching the inside of the combustor. The air reaching both the inside and the outside is initially compressed by the compressor section of the gas turbine engine. Combustors have typically been provided with a plurality of apertures to allow the relatively cool higher pressure air on the outside of the combustor to enter the combustor and thereby limit the maximum temperature of the wall of the combustor. It is desirable to limit the wall temperature by the use of such air to a predetermined temperature maximum which depends upon the material that is being used. It is also desirable to minimize the amount of air which passes from the outside of the combustor into the inside of the combustor through such cooling holes because the engine performance is degraded by the addition of the air passing into the combustor through the cooling holes.

Many combustor designs are relatively complex. For example, a typical combustor may utilize twelve splash rings to form the combustor liner, and one or more fuel nozzles and air swirlers. Such constructions are difficult and expensive to manufacture with present splash ring designs. In many cases it is necessary to use relatively exotic materials such as "HASTELLOY", a registered trademark of Cabot Corporation, to withstand the high wall temperatures caused by the hot gases inside the combustor.

It is an object of the invention to provide a combustor design which directs the flow of cooling air passing from the outside of the combustor to the inside of the combustor along the interior wall of the combustor to maximize the cooling effect produced by a given quantity of air.

It is another object of the invention to provide apparatus which is modular and thus permits the easy assembly of combustors of different sizes for different engine applications.

Still another object of the invention is to provide a combustor design which allows engine designs which use relatively higher combustion temperatures with known combustor wall materials.

Still another object of the invention is to provide a structure which will permit the use of materials which are widely available at reasonable costs.

Still another object of the invention is to provide apparatus which can be manufactured inexpensively utilizing relatively conventional manufacturing processes.

SUMMARY OF THE INVENTION

The foregoing objects and other objects and advantages which shall become apparent from the detailed description of the preferred embodiment are attained in a combustor subassembly for a gas turbine engine, which includes a plurality of modular elements. Each modular element is generally annular and extends from a first axial portion to a second axial portion. The second axial portion is flared inwardly toward the geometric center line of the modular element. The modular elements are disposed in nested, substantially coaxial relationship with successive modular elements spaced axially along a substantially common center line. A plurality of the adjacent modular elements have respective first and second axial portions disposed in overlapping relationship. The overlapping of the modular elements define annular flow passages for directing cooling air into the combustor. Each of a plurality of modular elements include holes therein in the first axial portion at an axial portion thereof which overlaps the second axial portion of another modular element. In addition each of a plurality of the modular elements include holes therein in the second axial portion.

In some forms of the invention the first axial portion is generally cylindrical and the second axial portion is axially tapered inwardly toward the geometric center line thereof. At least some of the modular elements may include a step shaped circumferential area which is axially adjacent to the second axial portion thereof and the step shaped circumferential area may be dimensioned and configured for receiving another of the modular elements. At least some of the modular elements may include a step shaped surface for cooperation with the other of the modular elements to define a ship lap joint. The outer wall of the combustor subassembly may have a substantially smooth outer wall.

BRIEF DESCRIPTION OF THE ACCOMPANYING DRAWING

The invention will be better understood by reference to the accompanying drawing in which:

FIG. 1 is a partial sectional view of two modular elements of a combustor subassembly. The view of FIG. 1 is a sectional view taken along the line I—I in FIG. 2 and which, more particularly, is along a plane which extends through the geometric center line of the annular subassembly. The center line is not shown, but will be understood to lie above the structure shown in FIG. 1.

FIG. 2 is a front elevational view of the combustor subassembly incorporating a plurality of modular elements of the type shown in FIG. 1.

DESCRIPTION OF THE PREFERRED EMBODIMENT

Figure 1:
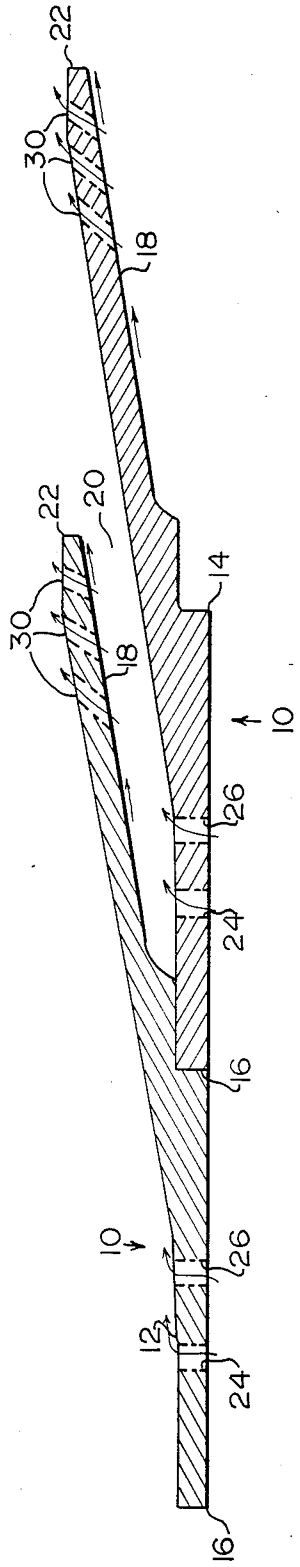
Figure 2:
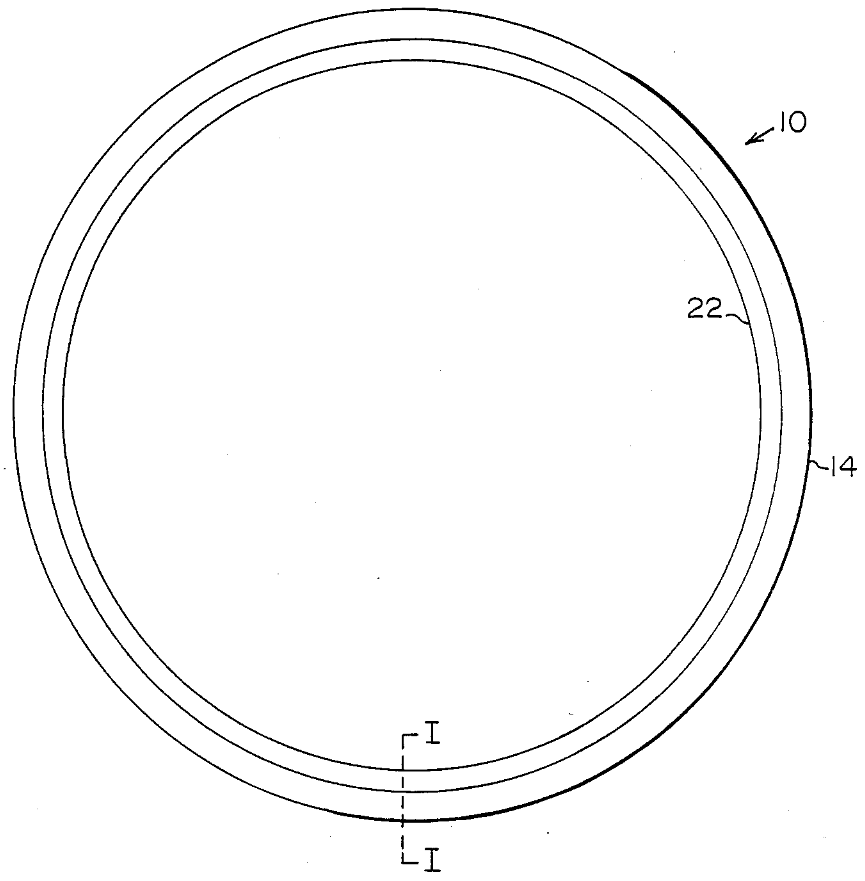

Referring now to FIGS. 1 and 2, there is shown a combustor assembly of a type which may be used either for a can type of combustor or the annular type of combustor which extends around the entire circumferential extent of a gas turbine engine. There are shown two modular elements 10. Each of the modular elements 10 is generally annular and has a first axial portion 12, which is generally cylindrical, and a second axial portion 18, which is flared inwardly toward the geometric center line of the modular elements 10. It will be understood that the modular elements 10 are disposed in coaxial relationship. Although only two of the modular elements 10 have been shown in cross-section in FIG. 1, it will be understood that many more of the modular elements 10 will be utilized in a typical combustor. In the embodiment shown in FIG. 1, the modular elements 10 cooperate in the manner of a ship lap in which a circumferentially extending step 14 cooperates with the butt end 16 of an adjacent modular element 10. An annular slot or tip gap 20 is defined intermediate the adjacent elements 10, 10. Since there are a large number of adjacent elements 10, 10, there are many slots 20 in the final assembly. The axial extremity of each modular element 10 remote from the butt end 16 is referred to as a tip end 22. The tip end 22 as well as the annular slot 20 direct the flow of cooling air from the outside of the combustor (the lower extremity of the Figure) through apertures or holes such as 24 and 26 and guide it along the inner face of the combustor to form a film of air which will reduce the temperature of the wall of the combustor.

In addition to the apertures or holes 24 and 26, the preferred embodiment of the invention also has apertures or holes 30, 30, 30 disposed in the second axial portion 18 of each modular element 10. Accordingly, the apparatus has both transpiration and film cooling to achieve the maximum effect. The array of small diameter cooling holes 30 shown in FIG. 1 replenish the cooling air film on the hot side surface near the splash ring tip 22 with cooler air. This matrix of holes 30, 30, 30 simultaneously provides additional cooling at the tip 22 where it is needed the most via the transpiration cooling effect. The transpiration cooling holes 30 preferably extend obliquely with respect to the splash ring tip 22 with the outlet of each hole 30 closer to the tip 22 than the inlet thereof. In other words, the holes 30 in each modular element 10 are disposed in oblique relation to a radius of the modular element 10 and are angled in such a way as to maximize their cooling effectiveness, since the surface area of the angled holes 30 is larger than that of non-angled holes 30. The obliquely disposed holes 30 should not cause separation of the boundary layer film and should replenish the layer with cooler air.

Transpiration cooling is a form of mass transfer cooling which involves a controlled pumping of a gas through a porous skin of the vehicle into the boundary layer. The injection of mass from the wall into the boundary layer must be such that it does not cause the cool boundary layer to become separated or "blown off".

Thus, the splash ring design in accordance with the invention has a unique long cooling air slot 20, with a minimum of 3:1 ratio of the slot 20 length to the slot 20 height. This allows the cooling air film to become well established, more uniform, and stabilized before exiting the tip gap 20. This design has a self-compensating tip 22, which prevents closure of the cooling air slot 20 due to thermal growth. The traditional disadvantage of having a long cooling air slot 20 has been the potential for tip 22 closure due to thermal growth mismatch. Closure compounds the problem since the more the tip 22 closes down, the less cooling air the tip 22 receives, causing further tip 22 closure. This is not a problem in the present design because the transpiration cooling enhancement near the splash ring tip 22 keeps the tip 22 cool, preventing tip 22 closure. Also, if the tip 22 did begin to close down, this would cause an increase in the transpiration cooling air flow, compensating for the loss in film cooling flow. So, the net effect is that the tip 22 is thermally stabilized without actual mechanical attachment to the underlying ring in the preferred embodiment. The relatively long cooling air slot 20 is advantageous because it allows the cooling air entering from the discrete feed holes 24, 26 to spread out into a uniform, contiguous film before it exits from the annular slot 20. Also, any swirl is dissipated in the film due to the long slot 20. The cooling air film should stay attached longer after it leaves the slot 20 and thereby provides more effective cooling.

The combination of film cooling and transpiration cooling tends to stabilize the tip 22 and reduce thermal stresses due to a more uniform temperature gradient in the ring. The stresses are reduced in the tip 22 region without having to thicken the ring, as in other designs. The present design is superior to constructions which simply put an array of small diameter cooling holes 30 in the combustor liner itself, without splash rings. The problem with such designs is that they require too much cooling air, given the fact that the minimum diameter of the holes 30 is about 0.020 inches because of plugging due to dirt and other contaminents in the cooling air. This design uses less cooling air than a transpiration cooled burner liner having no splash rings. In addition, it offers better protection against localized blockage of the smaller diameter transpiration cooling holes 30. The design is not sensitive to localized plugging of these holes 30 because the twin film cooling remains intact to protect the metal from damage. Some embodiments of the invention do not have any transpiration cooling holes 30, although they are included in the preferred embodiment.

In addition, the preferred embodiment has a unique smooth outer wall construction on the cool side of the burner liner.

For various applications, the dimensions of the unit will vary substantially. In one application, for use in a gas turbine engine having a can type combustor, The modular elements 10 are approximately 1.7 inches long. The second axial portion 18 of each modular element 10 is disposed at an angle of approximately ten degrees with respect to a perfect cylinder.

In a typical construction, the butt end 16 of the modular element 10 will be joined to another axial portion 18 of another modular element 10 by a combination of welding and brazing. In other forms of the invention the apparatus may be brazed together. The apertures 24, 26 are 0.050 inches in diameter, although other dimensions will be suitable for other applications. For the application referred to above, suitable aperture 24, 26 sizes would include the range of 0.030 to 0.060 inches.

In other forms of the invention the modular elements 10 may be joined to each other by butt welding instead of the ship lap structure, which is shown. In still other embodiments of the invention various other constructions are utilized for attaching respective modular elements 10.

In other forms of the invention discrete tabs, tangs, or serrations may be included at regularly spaced circumferential locations within the annular slot 20. The tabs, tangs, or serrations could act to limit the movement of the tip end 22 due to thermal expansion. This would establish a minimum cooling air gap 20 height in the annular slot 20 and prevent possible excessive closure thereof.

The apparatus, in accordance with the invention, may be manufactured by centrifugally casting the basic form of each modular element 10 and then machining to produce the precise contours which have been shown to be desirable. Thereafter the machining steps may include use of a high energy pulsed beam such as a laser or electron beam device to form the holes or apertures 24, 26, and 30. In some cases each of the holes or apertures 24, 26, and 30 may be formed with a single laser or electron beam which will penetrate not only through one radial location, such as that shown in FIG. 1, but will also extend completely through the diameter of the modular element 10 and penetrate the opposite wall thereof.

In other embodiments flat stock may be utilized instead of a centrifugally cast blank from which the object is to be machined. If flat stock is used, it will be rolled first and then butt welded to generally form the desired structure. Thereafter the butt welded flat stock may be machined to attain the precise contours which are desirable.

It will be seen that the apparatus in accordance with the invention does indeed provide a better "skin" of cooling air than has been previously generally possible. More particularly, the splash ring design, in accordance with the invention, utilizes a unique combination of film cooling and transpiration cooling to provide greater cooling effectiveness for a given amount of cooling air. This splash ring design has a cooling film on both the upper and lower sides of the ring, offering greater protection against the hot gases. A particular advantage to apparatus in accordance with the invention relates to the remote liner wall. That is, the hot side gases never see the outside diameter of the combustor liner wall, which is itself cooled by the cold side gases. The hot side gases only see the inside diameter of the modular elements 10, which have a protective cooling film on both sides. Thus, this construction has more tolerance to the effects of the hot combustion gases because of this remoteness.

Ordinarily, the cooling slot or cavity 20 is pressurized, that is the total pressure in the slot 20 exceeds the static pressure of the hot side gases. This pressurization causes the cooling air to flow through both the transpiration cooling holes 30 in the tip 22 region and out though the annular tip gap 20 as a cooling film. Transpiration cooling from a film cooled annular slot 20 is a particularly advantageous construction.

Because of the unique dual use of cooling air for film cooling and transpiration cooling, this construction uses less cooling air for a given cooling effect than other known apparatus.

The apparatus in accordance with the invention may also be relatively easily manufactured at a relatively low cost using materials that are readily available.

The invention has been described with reference to its illustrated preferred embodiment. It will be understood that the combustor may be generally cylindrical or may have a curved wall in which the modular elements 10 have a conical shape. Thus, the claims must be construed to cover such variations. Persons skilled in the gas turbine engine art may, upon exposure to the teaching herein, conceive other variations in the mechanical development of the components therein. Such variations are deemed to be encompassed by the disclosure, the invention being delimited only by the appended claims.

Having thus described my invention, I claim:

1. A combustor subassembly for a gas turbine engine, which comprises:

a plurality of modular elements;

each modular element being generally annular and extending from a first axial portion to a second axial portion, said second axial portion being flared inwardly toward the geometric center line of said modular element;

said modular elements being disposed in nested, substantially coaxial relationship with successive modular elements spaced axially along a substantially common center line;

a plurality of said adjacent modular elements having respective first and second axial portions disposed in overlapping relationship;

the overlapping of said modular elements defining annular flow passages for directing cooling air into said combustor;

each of a plurality of modular elements including holes therein in said first axial portion at an axial portion thereof which overlaps said second axial portion of another modular element; and each of a plurality of said modular elements including holes therein in said second axial portion.

2. The apparatus as described in claim 1, wherein:

said first axial portion is generally cylindrical and said second axial portion is axially tapered inwardly toward the geometric center line thereof.

3. The apparatus as described in claim 2, wherein:

at least some of said modular elements including a step shaped circumferential area which is axially adjacent to said second axial portion thereof, said step shaped circumferential area being dimensioned and configured for receiving another of said modular elements.

4. The apparatus as described in claim 3, wherein:

at least some of said modular elements include a step shaped surface for cooperation with the other of said modular elements to define a ship lap joint.

5. The apparatus as described in claim 2, wherein:

at least some of said modular elements include a step shaped surface for cooperation with the other of said modular elements to define a ship lap joint.

6. The apparatus as described in claim 1, wherein:

at least some of said modular elements include a step shaped surface for cooperation with the other of said modular elements to define a ship lap joint.

7. The apparatus as described in claim 1, wherein;

at least some of said modular elements including a step shaped circumferential area which is axially adjacent to said second axial portion thereof, said step shaped circumferential area being dimensioned and configured for receiving another of said modular elements.

8. The apparatus as described in claim 1, wherein:

the outer wall of said combustor subassembly has a substantially smooth outer wall.

9. The apparatus as described in claim 2, wherein:

the outer wall of said combustor subassembly has a substantially smooth outer wall.

10. The apparatus as described in claim 3, wherein:

the outer wall of said combustor subassembly has a substantially smooth outer wall.

11. The apparatus as described in claim 4, wherein:

the outer wall of said combustor subassembly has a substantially smooth outer wall.

12. The apparatus as described in claim 1, wherein:

each of said holes in said second axial portion of each modular element is disposed in oblique relation to a radius of that modular element.

13. The apparatus as described in claim 2, wherein:

each of said holes in said second axial portion of each modular element is disposed in oblique relation to a radius of that modular element.

14. The apparatus as described in claim 3, wherein: each of said holes in said second axial portion of each modular element is disposed in oblique relation to a radius of that modular element.

15. The apparatus as described in claim 4, wherein: each of said holes in said second axial portion of each modular element is disposed in oblique relation to a radius of that modular element.

16. The apparatus as described in claim 5, wherein: each of said holes in said second axial portion of each modular element is disposed in oblique relation to a radius of that modular element.

17. The apparatus as described in claim 6, wherein: each of said holes in said second axial portion of each modular element is disposed in oblique relation to a radius of that modular element.

18. The apparatus as described in claim 7, wherein: each of said holes in said second axial portion of each modular element is disposed in oblique relation to a radius of that modular element.

19. The apparatus as described in claim 8, wherein: each of said holes in said second axial portion of each modular element is disposed in oblique relation to a radius of that modular element.

20. The apparatus as described in claim 9, wherein: each of said holes in said second axial portion of each modular element is disposed in oblique relation to a radius of that modular element.

* * * * *